March 4, 1958 B. WALKER 2,825,580
AUXILIARY VEHICLE SUSPENSION USING PNEUMATIC
SPARE TIRE COMPRESSION
Filed Nov. 14, 1955 2 Sheets-Sheet 1

INVENTOR.
Brooks Walker

March 4, 1958   B. WALKER   2,825,580
AUXILIARY VEHICLE SUSPENSION USING PNEUMATIC
SPARE TIRE COMPRESSION Filed Nov. 14, 1955   2 Sheets-Sheet 2

INVENTOR.
Brooks Walker

United States Patent Office 2,825,580
Patented Mar. 4, 1958

2,825,580

AUXILIARY VEHICLE SUSPENSION USING PNEUMATIC SPARE TIRE COMPRESSION

Brooks Walker, Piedmont, Calif.

Application November 14, 1955, Serial No. 546,421

6 Claims. (Cl. 280—124)

This invention pertains to auxiliary vehicle supports and particularly to one in which the spare tire is carried in a conventional position on one side of the frame rearwardly of the rear axle. A radius rod extends from the rear axle to a point near the rear of the frame and is pivoted to both the frame and the rear axle in such a way that normal motion of the rear axle is permitted. A shoe on the radius rod contacts the bottom of the spare tire and the top of the spare tire is restrained by a mechanism including a shoe at the top of the tire which may be mechanically actuated to vary the degree of auxiliary support provided through the compressibility of the spare tire. The spare tire acting on this tire rod and tire shoe applies equal support to both rear wheels through the application of this yieldable force from the top of the spare tire, through the spare tire, through the spare tire compression, to the radius rod, to the center of the rear axle, equally to each of the rear wheels.

Another object of this invention is to provide a means whereby the compression of both the bottom and the top of the spare tire may be utilized to get greater motion of the spare tire compressibility than is possible if only one side is compressed relative to the wheel position.

Another object of the invention is to provide the use of the spare tire in the conventional position, utilizing movement of the bottom of the spare tire tread as well as the whole spare tire; applying force to the spare tire through a flexible boot connecting the sides of the spare tire well in the luggage compartment floor to keep dust and dirt out of the luggage compartment floor.

Other features of this invention will be more particularly pointed out in the accompanying specification and claims.

I have illustrated my invention by way of example in the accompanying drawings.

In all figures like numerals of reference refer to corresponding parts.

Figure 1:
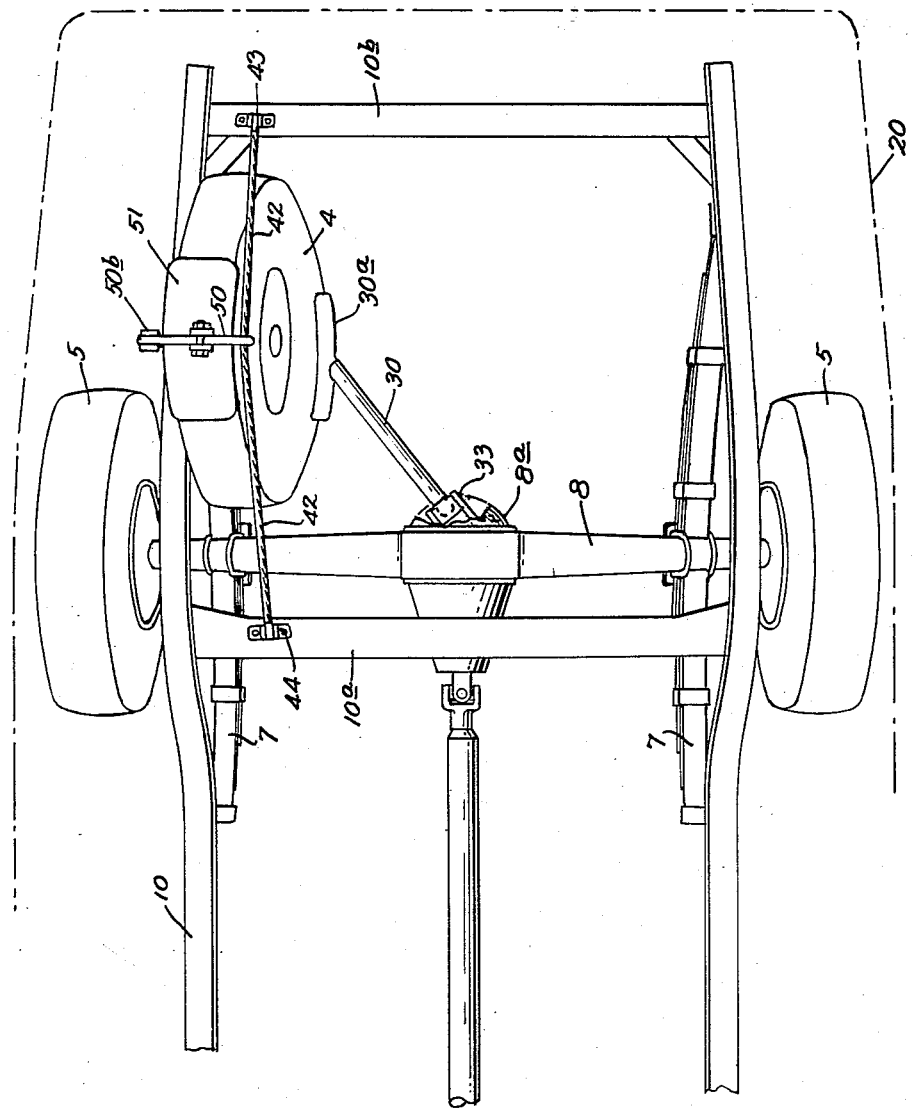
Fig. 1 is a perspective top plan view partially cut away, showing the rear portion of a vehicle including one form of the invention.
Figure 2:
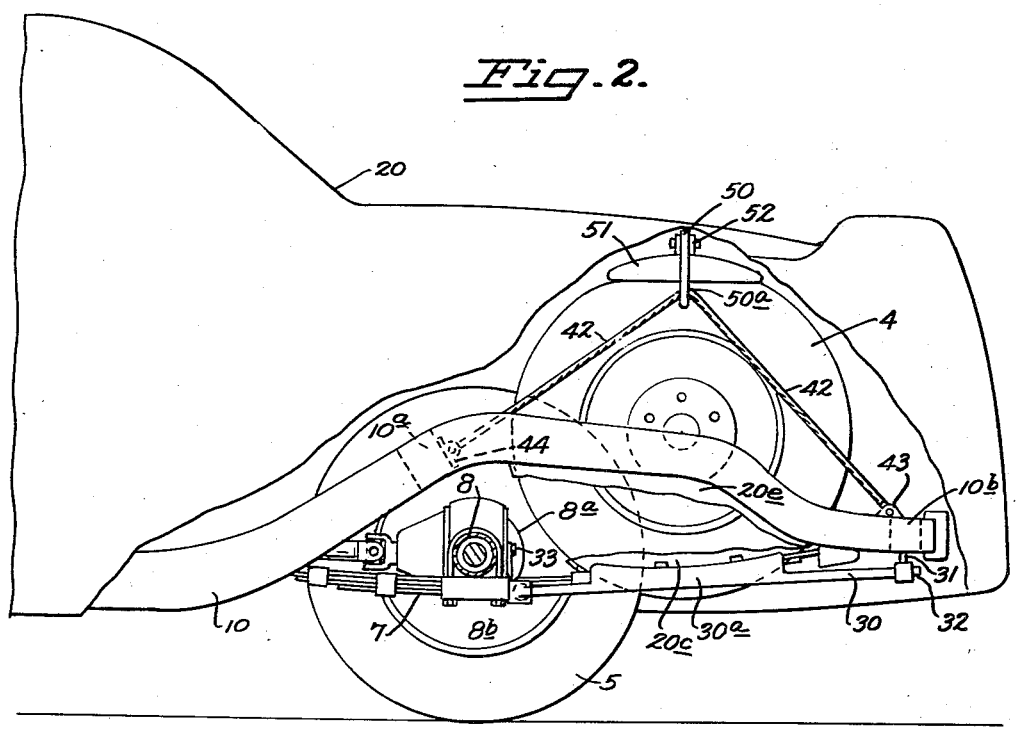
Fig. 2 is the partially cut away side view of the rear portion of the vehicle shown in Fig. 1, in reduced scale.
Figure 3:
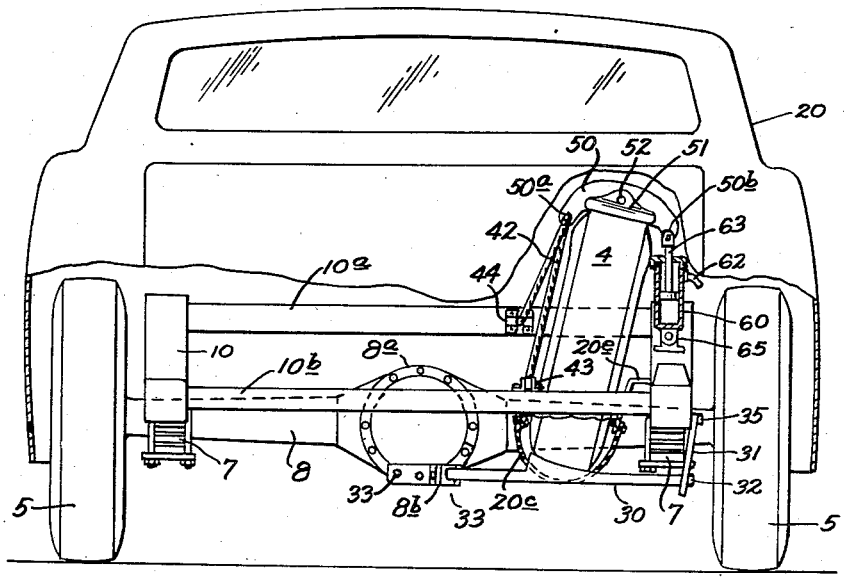
Fig. 3 is a partially cut away rear view of the vehicles shown in Figs. 1 and 2.

In Figs. 1, 2, and 3 I have shown a portion on the vehicle which has a body 20 supported on a frame 10 and has cross members 10a in front of the rear axle and cross member 10b at the rear end of the frame. Rear wheels 5 support the frame through leaf springs 7 which are suitable for supporting the vehicle with a light load. Axle 8 is the mechanism in which the rear wheels rotate and by which they are secured to the leaf springs 7 by the usual U-bolts. A differential 8a is located near the center of the rear axle. Radius rod 30 is secured by bolt 33 to brackets 8b at the bottom of the differential housing. Bolt 33 is preferably surrounded by a rubber bushing inside of the ring end of radius rod 30 similar to the rubber connection on the top of a shock absorber which has a ring end, which allows more or less universal action as may be necessary in all the different motions of the rear axle in acceleration and deceleration partial rotation and moving in a radius as determined by the front half of leaf springs 7. The rearward end of radius rod 30 is secured to the frame 10 by means of a flexible link 31. Link 31 may be secured at its upper end by bolts 35 to frame 10 and at its lower end to the rear of the radius rod 30 by bolts 32. This flexible link 31 may be a piece of rubberized fabric similar to the material used in the support of exhaust pipes on vehicles. Spare tire 4 is carried in the usual well, 20e, in the luggage compartment and has a flexible boot 20c which is connected to the sides of the tire well 20e and extends under the spare tire and above shoe 30a which is carried by radius rod 30. Spare tire 4 is restrained from moving upwards by the cable 42 which is secured to cross member 10b by bracket 43 and at its forward end to cross member 10a by bracket 44 and associated bolts. Cross beam 50 carries shoe 51 and is secured thereto by pivot bolt 52, so that cross beam 50 may rock relative to shoe 51. Hole 50a accommodates cable 42 and acts as a pivot for beam 50 relative to cable 42. A hydraulic cylinder 60 carries the piston rod 63 which is secured to beam 50 through bolt 50b. Cylinder 60 is secured to the frame 10 by a bracket 65. When liquid is introduced into cylinder 60 by pipe 62, piston rod 63 will be retracted and shoe 51 will be lowered to bear down on the top of spare tire 4. This lowering of shoe 51 will give greater resilient support to the shoe 30a on radius rod 30 and increase the auxiliary vehicle support. The control for the hydraulic circuit which actuates the hydraulic cylinder 60 may be from the power steering pump, as shown in my co-pending application, Ser. No. 343,110, or from a pump, reservoir, control valve unit mounted between the axle and the frame 10, as shown in my co-pending application, Ser. No. 459,441, or by operator foot pump as shown in my application Ser. No. 394,244, or any other suitable means. If it is desired to vary the auxiliary support, the operator merely changes the hydraulic loading on cylinder 60 which varies the amount of vertical movement of shoe 50 on top the spare tire 4. This will vary the degree of auxiliary support provided from a spare tire fitted in one side of the rear of the vehicle to a radius rod which is attached to rear axle near its center, to supply the auxiliary load equally to both rear wheels.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A vehicle having a rear axle, rear wheels on said rear axle, a body supported by said rear wheels, an inflated spare tire and rim assembly, a first shoe connected to said axle by a rigid member, so that its motion is a direct function of the motion of said axle relative to said body, said spare tire resting at all times on said first shoe, a second shoe bearing at all times against said spare tire opposite said first shoe, and means for raising and lowering said second shoe relative to said body for varying the degree of auxiliary support supplied by said spare tire, said means including a hydraulic cylinder secured to said body at one side of said second shoe, and a linkage connected to said cylinder and to said second shoe so that said cylinder is actuable for raising and lowering said second shoe.

2. A vehicle having a body, rear wheels, a structure on which said wheels rotate, an inflated spare tire carried in said body on a spare wheel supported only by said spare tire, a flexible element contacting said spare tire and secured to said body to form part of a spare wheel enclosure within said body, and means for providing a portion of the resilient support for said body on said structure through the compressibility of said spare tire, said means including a rigid member connected to said structure and supporting said flexible element for transmitting motion of said structure to said spare tire through said flexible element, and means for supporting a portion of the weight of said body on the opposite side of said spare tire from said flexible element.

3. The vehicle of claim 2, in which said flexible element is a boot under said spare tire.

4. In a vehicle having a frame, rear wheels on a rear axle supporting said frame, a spare tire compartment at one side of said vehicle rearwardly of said axle, and a spare tire and wheel assembly in said compartment, an auxiliary vehicle suspension means in combination therewith, comprising a radius rod secured for free rotation at one end to a central portion of said rear axle and at its other end by a flexible strap to said frame; a first shoe carried on said radius rod in between its ends; a flexible boot providing support for the spare tire assembly and positioned between and in engagement with said first shoe and the bottom of said spare tire substantially diametrically opposite said first shoe; a cable secured on one side of said second shoe and having its ends anchored to the vehicle frame; and a hydraulic cylinder secured to the other side of said second shoe so that on actuation of said cylinder, the pressure of said second shoe on said spare tire is changed, whereby said spare tire provides resiliency for vehicle suspension between an upward force on said radius rod caused by relatively upward movement of said axle with respect to said frame and the downward force of said second shoe.

5. In a vehicle having a frame, rear wheels on a rear axle supporting said frame, a spare tire compartment at one side of said vehicle rearwardly of said axle, and a spare tire and wheel assembly in said compartment, an auxiliary vehicle suspension in combination therewith comprising rigid means pivotally secured at one end to said rear axle; a first shoe carried on said radius rod; a flexible boot positioned between and in engagement with said first shoe and said spare tire; a second shoe resting on the upper end of the spare tire substantially diametrically opposite said first shoe; and hydraulic means for changing the pressure of said second shoe on said spare tire.

6. In a vehicle having a frame, rear wheels on a rear axle supporting said frame, a spare tire compartment at one side of said vehicle rearwardly of said axle, and a spare tire and wheel assembly in said compartment, an auxiliary vehicle suspension device in combination therewith comprising rigid means secured for limited free rotation at one end to said rear axle and secured to said frame at its other end by a flexible connection; a first shoe carried on said rigid means in between its ends; a flexible boot positioned between and in engagement with said first shoe and a lower portion of said spare tire; a second shoe resting on an upper portion of the spare tire substantially diametrically opposite said first shoe; means securing one side of said second shoe relative to the vehicle frame; and hydraulic means secured to the other side of said second shoe and actuable to change the pressure of said second shoe on said spare tire.

References Cited in the file of this patent

UNITED STATES PATENTS

| 1,630,062 | Fay | May 24, 1927 |
| 1,642,946 | Fay | Sept. 20, 1927 |

FOREIGN PATENTS

| 25,747 | Great Britain | Nov. 28, 1908 |